Patented Apr. 8, 1930

1,753,538

UNITED STATES PATENT OFFICE

BURR W. TUTTLE, OF CHICAGO, ILLINOIS

CEMENT

No Drawing.  Application filed October 18, 1926. Serial No. 142,521.

The present invention relates particularly to cement or a cementitious compound which is adapted for use in connection with metal objects, such as for filling cracks or sand holes, for repairing leaks or for fastening parts together.

The objects of this invention are to provide a new and improved cement or composition for the purposes indicated; to provide a cement which may be readily compounded or manufactured and which will be particularly durable and efficient in use; to provide a cement which may be used for filling sand holes in castings and which may be readily machined and will have the appearance of the casting; and to provide a cement which may be adapted for more or less general use in addition to the uses above suggested.

A preferred form of my composition comprises asbestos, oxide of zinc and metal filings or finely comminuated particle which are mixed together and to the mixture is added a suitable liquid binder to make a paste.

As a specific embodiment of this invention, I use seven parts (by measure) asbestos, three parts of oxide of zinc, and four parts of finely divided metal, which preferably comprises iron fillings of about forty gauge. These ingredients are thoroughly mixed together in a dry condition and a sufficient quantity of liquid binder having a volatile ingredient, such as shellac, is added to the mixture to make a stiff paste or plastic mixture which may be readily applied to the parts on which the cement is used.

After this cement is applied, the solvent in the shellac, which is usually alcohol, will gradually volatilize, leaving a comparatively hard compact mass. When the cement is thoroughly set it is not injured when subjected to relatively high temperatures and will stand ordinary steam or water pressure, as when used for repairing pipes, tanks, or the like. The setting may be expedited in some instances by applying heat to the parts adjacent to the cement.

The proportions of the different ingredients may be varied to a greater or less degree in order to adapt the material for different uses, and therefore, I do not wish to be limited to the exact composition above described, except as specified in the following claims, in which I claim:

1. A cement of the character set forth consisting of the following ingredients by measure seven parts of asbestos, three parts of oxide of zinc, and four parts of iron filings mixed with sufficient shellac to make a paste.

2. A cement consisting of a mixture of finely divided asbestos, powdered oxide of zinc, and finely divided iron with sufficient shellac dissolved in alcohol to make a paste which may be conveniently worked or applied.

3. A plastic cementitious composition of matter consisting of asbestos, oxide of zinc, iron filings, and shellac.

4. A mending cement in plastic form adapted to harden by drying, consisting of seven parts asbestos, three parts of oxide of zinc and four parts of forty-gauge iron filings all mixed together in a dry condition in combination with sufficient shellac dissolved in alcohol and added to the dry mixture to make a thick paste, the paste drying by the evaporation of the alcohol.

BURR W. TUTTLE.